(12) United States Patent
Winiar et al.

(10) Patent No.: US 10,589,376 B2
(45) Date of Patent: Mar. 17, 2020

(54) BASE PART OF A MOLD FOR WELDING METAL RAILS

(71) Applicant: Railtech International, Raismes (FR)

(72) Inventors: Lionel Winiar, Ronchin (FR); Pierre Bordery, Vieux Conde (FR)

(73) Assignee: Railtech International (FR)

( * ) Notice: Subject to any disclaimer, the term of this patent is extended or adjusted under 35 U.S.C. 154(b) by 181 days.

(21) Appl. No.: 15/745,232

(22) PCT Filed: Jul. 13, 2016

(86) PCT No.: PCT/FR2016/051805
§ 371 (c)(1),
(2) Date: Jan. 16, 2018

(87) PCT Pub. No.: WO2017/013332
PCT Pub. Date: Jan. 26, 2017

(65) Prior Publication Data
US 2019/0015926 A1    Jan. 17, 2019

(30) Foreign Application Priority Data

Jul. 17, 2015 (FR) ..................................... 15 56778

(51) Int. Cl.
*B23K 23/00* (2006.01)
*E01B 29/42* (2006.01)
*E01B 29/46* (2006.01)
*B23K 101/26* (2006.01)

(52) U.S. Cl.
CPC .............. *B23K 23/00* (2013.01); *E01B 29/42* (2013.01); *E01B 29/46* (2013.01); *B23K 2101/26* (2018.08)

(58) Field of Classification Search
CPC .......... B23K 23/00; E01B 29/42; E01B 29/46
See application file for complete search history.

(56) References Cited

U.S. PATENT DOCUMENTS

2010/0276109 A1   11/2010   Winiar et al.

FOREIGN PATENT DOCUMENTS

FR    2890668 A1   3/2007
FR    2923740 A1   5/2009

OTHER PUBLICATIONS

Preliminary Search Report for FR1556778 dated May 4, 2016.
International Search Report including Written Opinion for PCT/FR2016/051805 dated Oct. 17, 2016.

*Primary Examiner* — James Sanders
(74) *Attorney, Agent, or Firm* — Lerner, David, Littenberg, Krumholz & Mentlik, LLP

(57) ABSTRACT

The invention relates to base part of a mold for aluminothermic welding of metal rails, which base part generally has a rectangular parallelepiped and has an upper face for receiving the foot of said rails, this upper face having a hollow cavity comprising a base, two opposing longitudinal side walls, and two opposing transverse side walls. The invention is characterized in that each of said longitudinal side walls has an intermediate region surrounded by two end regions, and these end regions are located in the same plane, whereas the intermediate region has a curved profile, the well of which is directed towards the opposite side wall.

11 Claims, 4 Drawing Sheets

BASE PART OF A MOLD FOR WELDING METAL RAILS

CROSS REFERENCE TO RELATED APPLICATIONS

The present application is a national phase entry under 35 U.S.C. § 371 of International Application No. PCT/FR2016/051805 filed Jul. 13, 2016, published in French, which claims priority from French Patent Application No. 1556778 filed Jul. 17, 2015, all of which are incorporated herein by reference.

FIELD OF THE INVENTION

The present invention relates to a base part of a mold for aluminothermic welding of metallic rails.

It also relates to a mold which makes use thereof, as well as a welding method making use of a mold using such a base part.

TECHNOLOGICAL BACKGROUND OF THE INVENTION

The attached FIGS. 1 and 2 show a mold M according to the prior art comprising three parts 1, 2 and 6, the mold M being seen in the assembled state on the ends 4 of two railway rails 3, to be welded to each other. These views are reprised from application FR 2 923 740 in the name of the present applicant.

These ends 4 rest on a base part 6 shown in detail in FIGS. 3 and 4.

The base part 6 (or "briquette") is generally part of a rectangular parallelepiped and has an upper receiving face 60 and supports of the foot of said rails, this upper face having a hollow cavity 61 comprising a base 610, two opposite longitudinal flanks 611, as well as two opposite transverse flanks 612. Configured in this way, the cavity also has the form of a rectangular parallelepiped.

During molding, the welding material is introduced not only between the rail ends 4, but also into the free space E delimited by the above cavity 6.

On the finished product this is embodied by a region projecting from the lower face of the ends 4 joined to each other. This projection is not disabling to the extent where the rails will rest on sleepers.

The certification of a welding method by aluminothermy needs to satisfy the requisites of a specification. This specification demands respect of many criteria relative especially to chemical analysis, hardness, defect analysis, width of the molten zones, fatigue resistance, flexion resistance, etc.

Depending on the certification body, requisites relative to these different criteria can vary.

Accordingly, in some countries the criterion most difficult to respect is flexion resistance (3 points).

FIG. 5 schematically illustrates a flexion test conducted on rails. As is evident, the couple of rails 3 welded to each other is supported by the foot on two cylindrical surfaces A on either side of the weld and a force F is applied to the rail head, vertically to the weld S. According to the standard EN14730-1 (annex F) the radius r of application of the load and support of the sample is between 25 and 70 mm, the minimal length of the sample is 1150 mm and the load rate is less than or equal to 60 kN/s.

In this way, for rails referenced JIS60A HH (a thermally treated nuance, of high hardness), the certification body imposes rupture displacement of at least 10 mm. Experience shows that, irrespective of developments made, this value is difficult to achieve, as shown in the following table.

| Rail | Grade | Slow Flexion trial Foot in tension | | Slow Flexion trial Head in tension | |
|---|---|---|---|---|---|
| | | Minimal deflection | Maximum deflection | Minimal deflection | Maximum deflection |
| 50N | D | 10 mm | 800 kN | 13 mm | 800 kN |
| 50N | 345 | 10 mm | 950 kN | 10 mm | 950 kN |
| 60K | D | 10 mm | 1100 kN | 13 mm | 1100 kN |
| 60K | 345 | 10 mm | 1250 kN | 10 mm | 1250 kN |

The grade corresponds to the nuance of the weld. In this way, the Grade 345 corresponds to the nuance used for a rail with hardened head (HH).

To improve flexion resistance, research has focused on analysis of facies, that is, rupture zones and initiation points of ruptures on the welds broken in flexion.

Morphologies and sizes of the molten zones at the foot have been observed. The geometries and dimensions of bosses of molds and finally of bosses of welds have been analyzed.

The general aim was to avoid geometric singularities which penalize the mechanical properties and can cause equally penalizing metallurgical defects.

In this way, against all expectations, the present applicant has designed a particular geometry of a base part which ensures better resistance to flexion forces.

SUMMARY OF THE INVENTION

To this end the invention proposes a base part of a mold for aluminothermic welding of metallic rails, which is generally part of a rectangular parallelepiped and which has an upper face for receiving the foot of said rails, this upper face having a hollow cavity comprising a base, two opposite longitudinal flanks, as well as two transverse opposite flanks, characterized in that:
  said longitudinal flanks each present an intermediate region flanked by two end regions;
  these end regions are located in the same plane, whereas the intermediate region has a curved profile, of concavity directed towards the opposite flank.

By way of advantage, said intermediate region connects progressively to said end regions, without acute angle.

Also, the base of the cavity connects to said longitudinal flanks according to a curved profile, without acute angle.

According to characteristics considered singly or in combination:
  said curved profile has a radius of curvature between 50 and 100 mm;
  the ratio between the length of the intermediate region and the length of a longitudinal flank is between 30 and 50%;
  the ratio between the distance between the longitudinal flanks in the end regions and the maximum distance between the longitudinal flanks in the intermediate region is between 75 and 90%.

The invention also relates to a mold for aluminothermic welding of metallic rails, which comprises two half-molds of symmetrical and mutually adjoining forms, and a base part on which each of said half-molds is supported, characterized in that said base part is such as described hereinabove.

According to an embodiment, the base part is constituted by two separate portions which are symmetrical to each other relative to a plane parallel to said transverse flanks.

The invention also relates to a mold for aluminothermic welding of metallic rails, which comprises two half-molds of symmetrical and mutually adjoining forms, characterized in that it comprises a base part such as defined hereinabove, each portion being integral with a half-mold.

The invention finally relates to a method for aluminothermic welding of metallic rails, characterized in that use is made of a mold such as defined hereinabove.

A novel geometry of a base part was tested from analyses conducted. The first aim was to achieve continuity between the geometry of the molten zone at the foot and the geometry of the base part. The second aim was to smooth the connection between the boss under foot of the weld and the rails.

With a base part according to the prior art whereof the geometry of the boss is rectangular, rupture displacements of welds broken in 3-point flexion remain in an average of 9 to 11 mm with many results under 10 mm.

With a base part according to the invention, rupture displacements of welds broken in 3-point flexion are in an average of 10 to 12 mm with results sometimes over 12 mm.

BRIEF DESCRIPTION OF THE DRAWINGS

Other features and advantages of the invention will emerge from the following description of a preferred embodiment of the invention. This description is given in reference to the appended drawings in which.

DETAILED DESCRIPTION OF THE INVENTION

Figure 3:
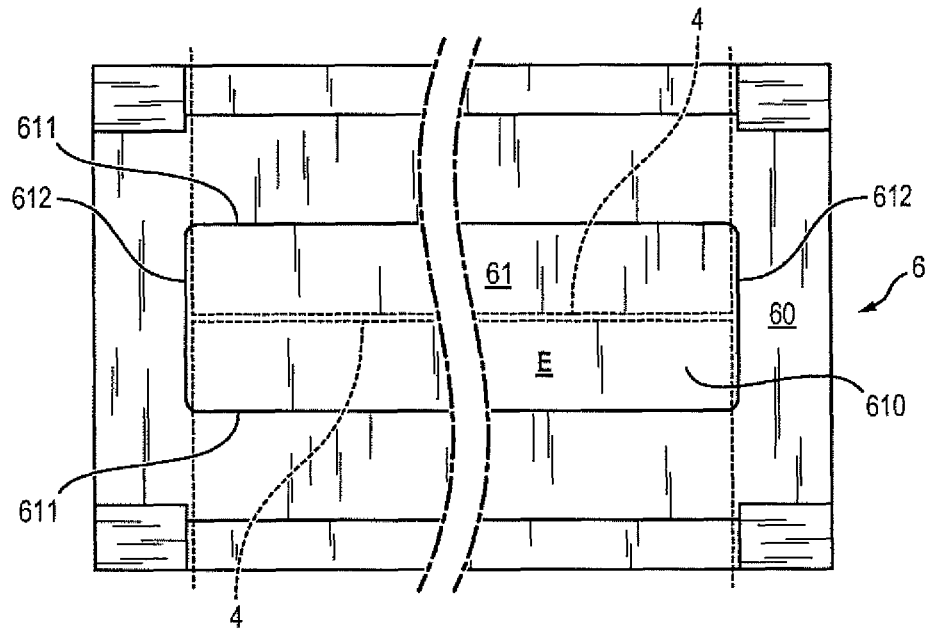
FIG. 3 is a plan view of a base part, still according to the prior art, forming part of the mold of the preceding figures.
Figure 4:
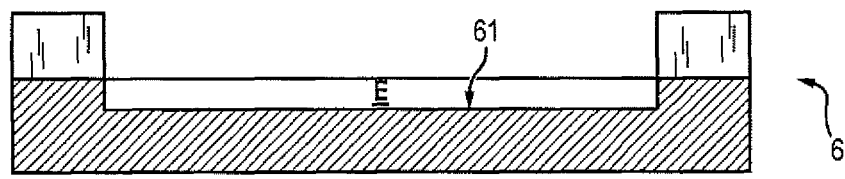
FIG. 4 is a view in coupe longitudinal section of the base part of FIG. 3.
Figure 5:
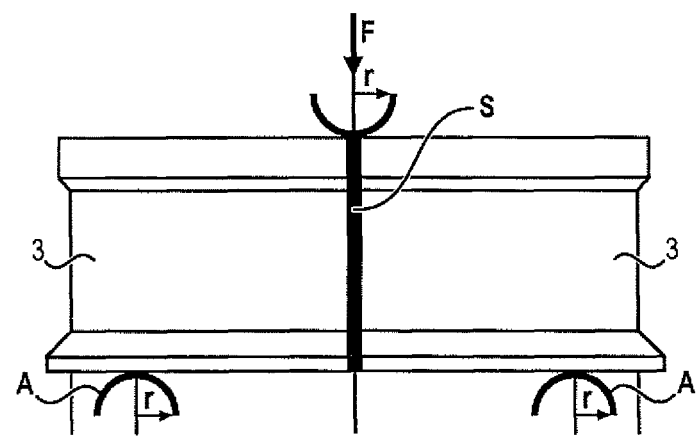
FIG. 5 is a simplified diagram a slow flexion test, conducted on two rails to each other by means of a mold according to FIGS. 1 and 2.
Figure 6:
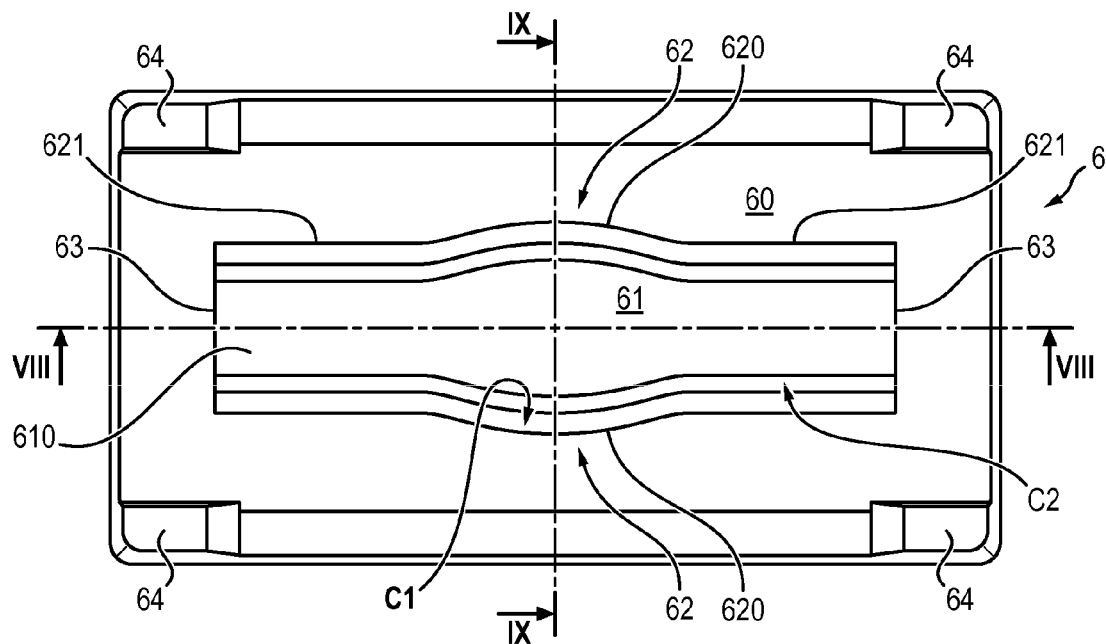
FIGS. 6 to 9 are views, respectively plan views and side elevations, according to the plane of longitudinal section VIII-VII of FIG. 6 and according to the plane of transverse section IX-IX of FIG. 6 of a base part according to the present invention.
Figure 7:
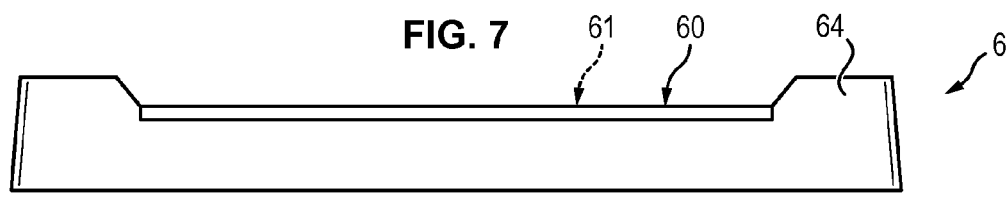
Figure 8:
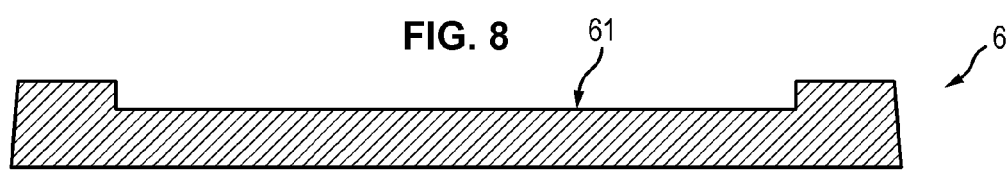
Figure 9:
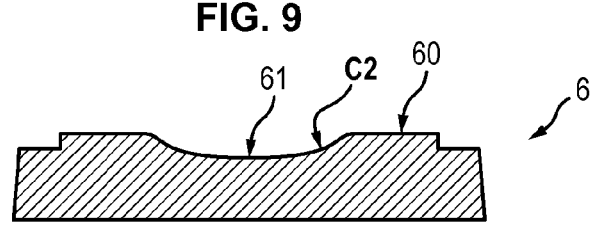

In reference quite particularly to FIG. 6, it is evident that the base part 6 of the invention has the same general look as that belonging to the prior art and shown in FIG. 3.

It is constituted by rigid refractory material (for example sand+additive).

It has the general look of a briquette and is part of a rectangular parallelepiped.

Its upper plane support face is referenced 60 and at each angle comprises a stud 64 which rises perpendicularly to the latter. The essential function of these studs, already existing in known base parts, is to wedge the base part relative to the rails to be welded (see FIG. 3 in which the two rails are represented in broken lines). In these conditions, the spacing between the studs 64 located along the same long side of the part 6 corresponds to the width of the rails to be welded, at the level of their foot 5.

The cavity 61 is centered relative to the face 60. Its base 610 is plane and parallel to the face 60. It is delimited by two long longitudinal flanks 62 and two short transverse flanks 63 which connect to the base 610.

In accordance with the invention, each longitudinal flank 62 has an intermediate region 620 which is flanked by two end regions 621.

By way of indication, each of these three regions extends approximately over a third of the length.

The end regions 621 are located in the same plane, meaning that if they were contiguous, they would be in the continuity of each other.

The intermediate region 620 as such has a curved profile C1 of concavity directed towards the opposite flank 62. The mutual spacing between the two intermediate regions 620 is therefore larger than the mutual spacing between two end regions 621 facing each other.

By way of indication, the ratio between the length of the intermediate region 620 and the length of a longitudinal flank 62 can be between 30 and 50%.

Also, the ratio between the distance between the longitudinal flanks 62 in the end regions 621 and the maximum distance between said longitudinal flanks 62 in the intermediate region 620 can be between 75 and 90%. For example, the distance between the regions 621 opposite can be between 30 and 50 mm, whereas the maximum distance between the flanks in the intermediate region can be between 40 and 60 mm.

The intermediate region 620 connects to the end regions 621 smoothly and progressively, without any acute angle.

According to a preferred embodiment, the base 610 of the cavity 61 connects to the longitudinal flanks 62 according to a second curved profile C2, without acute angle. By way of indication, the radius of curvature C2 can be between 50 and 100 mm. Depending on the preferred depth of the cavity 61, the base 610 can comprise a plane or curved portion.

On the other hand, the upper face 60 connects to the flanks 62 with a radius of curvature which can be typically between 2 and 15 mm.

The short transverse flanks 63 remain unchanged, meaning that they extend perpendicularly to the base 61.

Figure 10:
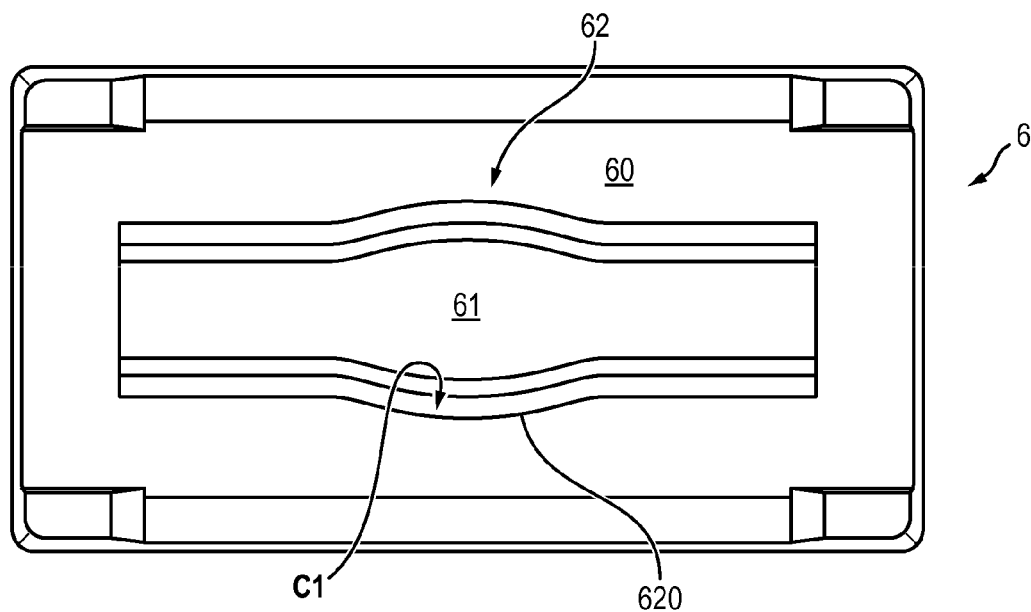
FIG. 10 is a view similar to FIG. 6 of a variant embodiment of the base part; finally

FIG. 10 shows another base part 6 which has the particular feature of presenting a profile C1 of larger radius than the one illustrated in FIG. 6. Despite this change in radius, the base part gives full satisfaction in terms of the specification.

Figure 1:
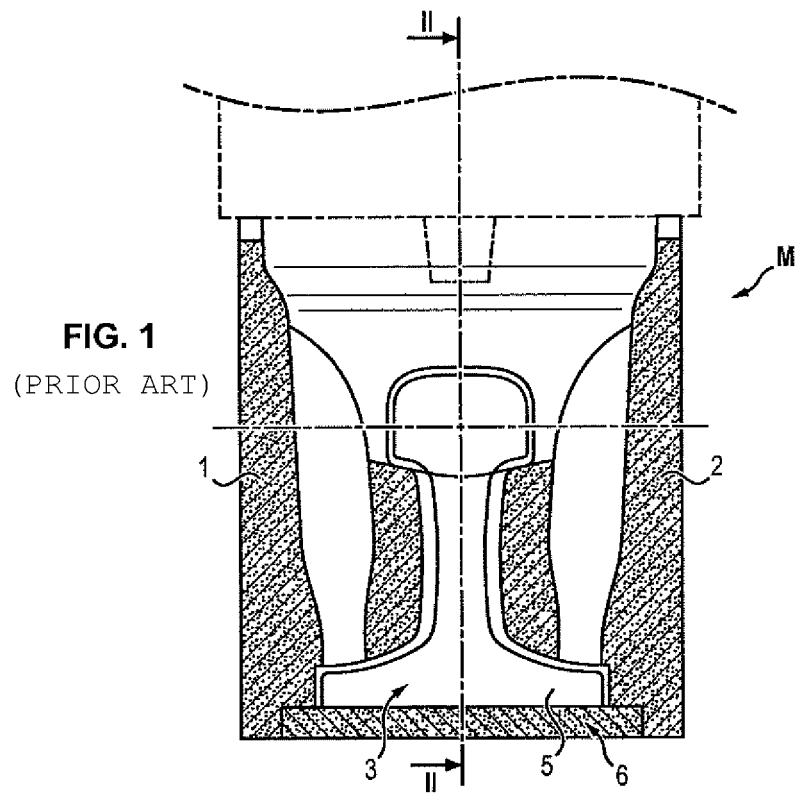
FIG. 1, as already mentioned above, is a view of a mold according to the prior art, comprising three parts, the mold being seen in the assembled state on the ends of two railway rails to be welded to each other, and in section relative to a transverse plane of symmetry between these ends, as shown according to the sectional plane I-I of FIG. 2.
Figure 2:
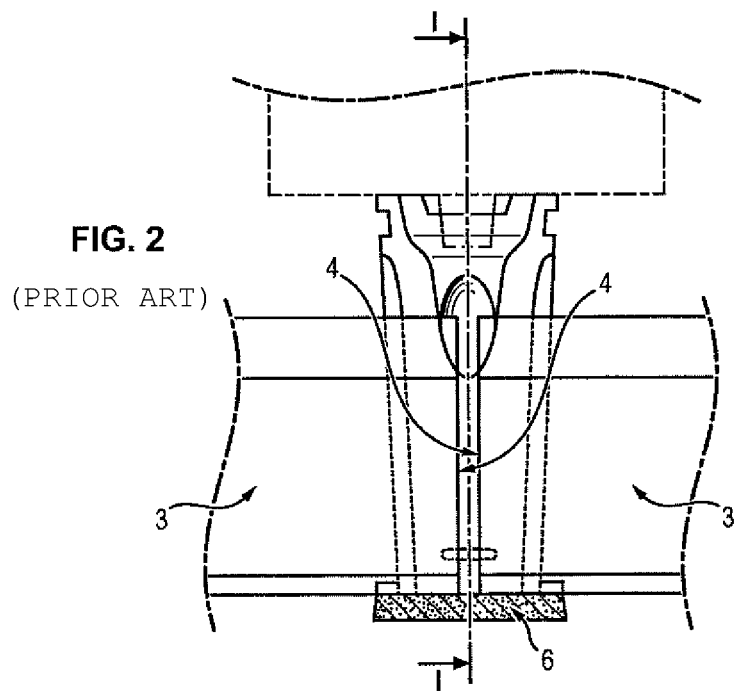
FIG. 2 is a view of the mold of FIG. 1 in section according to a longitudinal plane of symmetry common to the two rail ends, as such shown in elevation according to the plane II-II of FIG. 1.

Such a base part is intended to be used inside a mold M which comprises two half-molds 1 and 2 of symmetrical and mutually adjoining forms, as shown in FIG. 1. In this case, each of the half-molds is supported on the base part. Said mold is therefore in three parts: the two half-molds and the base part.

In a variant embodiment, the base part 6 is not constituted by a single separate part of the half-molds, but comprises two parts 6a and 6b integrated respectively into one of the half-molds. Said portions 6a, 6b are symmetrical relative to each other according to a plane parallel to the transverse flanks 63, this plane corresponding to the plane of longitudinal symmetry of the rails to be welded.

Figure 11:
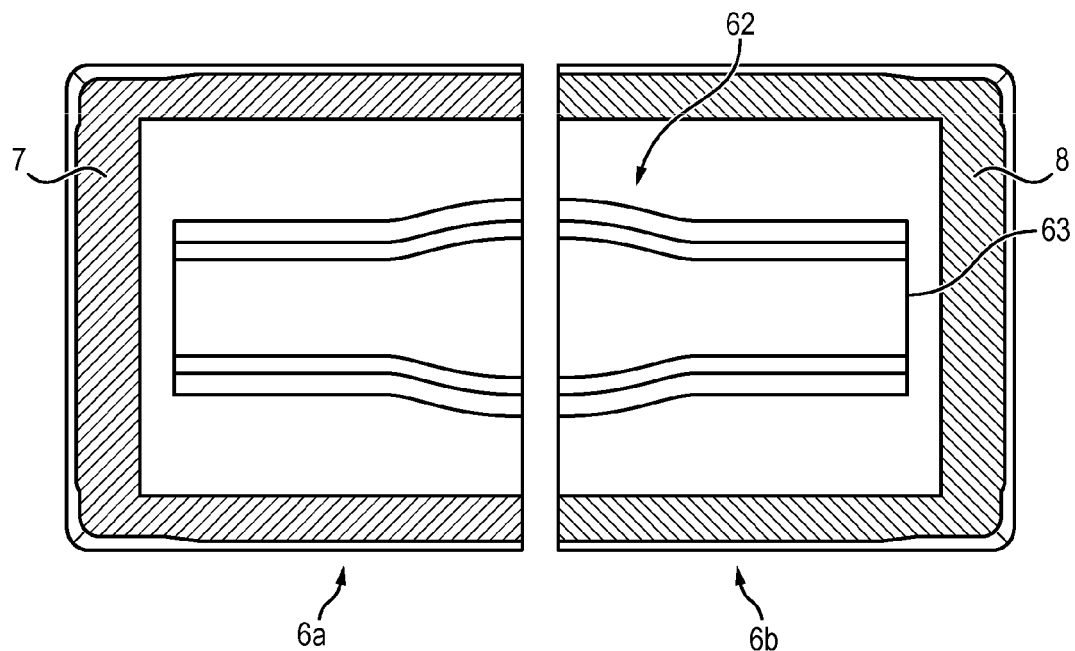
FIG. 11 is a simplified plan view and in transverse section of a mold which makes use of two "base half-parts".

In this case, which is shown in FIG. 11, the mold is in two parts, specifically the two half-molds of symmetrical and mutually adjoining forms, each half-mold being integral with a base half-part corresponding to the half of the base part described earlier (the junction between the two base half-parts being in the plane of longitudinal symmetry of the rails).

Examples of such molds are described especially in documents U.S. Pat. No. 6,125,913, FR 2 434 678 and U.S. Pat. No. 4,250,944.

In FIG. 11 the base half-part 6a forms an integral part of the half-mold 7, whereas the base half-part 6b forms an integral part of the half-mold 8.

The method for aluminothermic welding of metallic rails is executed quite conventionally by means of a mold comprising a base part according to the present invention.

The present base part allows smoothing the connection between the bosses under foot of the weld and the rails. This helps prevent geometric singularities which penalize the mechanical properties and which can cause equally detrimental metallurgical defects.

Finally, the rupture displacements of welds broken in 3-point flexion are relatively improved.

REFERENCES

FR 2 923 740

The invention claimed is:

1. A base part of a mold for aluminothermic welding of metallic rails, which is generally inscribed in a rectangular parallelepiped and which has an upper face for receiving a foot of said rails, this upper face having a hollow cavity comprising a base, two opposite longitudinal flanks, as well as two transverse opposite flanks, wherein:

said longitudinal flanks each present an intermediate region flanked by two end regions;

said end regions are located in the same plane, whereas the intermediate region has a curved profile, of concavity directed towards the opposite flank.

2. The base part according to claim 1, wherein said intermediate region connects progressively to said end regions, without acute angle.

3. The base part according to claim 1, wherein the base of the cavity connects to said longitudinal flanks according to a curved profile, without acute angle.

4. The base part according to claim 3, wherein said curved profile has a radius of curvature between 50 and 100 mm.

5. The base part according to claim 1, wherein the ratio between the length of the intermediate region and the length of a longitudinal flank is between 30 and 50%.

6. The base part according to claim 1, wherein the ratio between the distance between the longitudinal flanks in the end regions and the maximum distance between the longitudinal flanks in the intermediate region is between 75 and 90%.

7. The base part according to claim 1, being constituted by two separate portions which are symmetrical to each other relative to a plane parallel to said transverse flanks.

8. A mold for aluminothermic welding of metallic rails, which comprises two half-molds of symmetrical and mutually adjoining forms, and a base part according to claim 1 on which each of said half-molds is supported.

9. A mold for aluminothermic welding of metallic rails, which comprises two half-molds of symmetrical and mutually adjoining forms, comprising a base part according to claim 7, each portion being integral with a half-mold.

10. A method for aluminothermic welding of metallic rails, wherein a mold according to claim 8 is used.

11. A method for aluminothermic welding of metallic rails, wherein a mold according to claim 9 is used.

* * * * *